United States Patent
Bamberg et al.

(10) Patent No.: US 10,070,069 B2
(45) Date of Patent: Sep. 4, 2018

(54) METHOD AND DEVICE FOR DETERMINING A CONTOUR, AT LEAST IN REGIONS, OF AT LEAST ONE ADDITIVELY MANUFACTURED COMPONENT LAYER

(71) Applicant: MTU Aero Engines AG, Munich (DE)

(72) Inventors: Joachim Bamberg, Dachau (DE); Guenter Zenzinger, Waakirchen (DE)

(73) Assignee: MTU AERO ENGINES AG, Munich (DE)

( * ) Notice: Subject to any disclaimer, the term of this patent is extended or adjusted under 35 U.S.C. 154(b) by 145 days.

(21) Appl. No.: 15/152,825

(22) Filed: May 12, 2016

(65) Prior Publication Data

US 2016/0344948 A1  Nov. 24, 2016

(30) Foreign Application Priority Data

May 19, 2015  (EP) .................................. 15168150

(51) Int. Cl.
*H04N 5/262* (2006.01)
*B22F 3/105* (2006.01)
*G06T 7/00* (2017.01)
*G06T 7/12* (2017.01)
*B29C 64/153* (2017.01)
(Continued)

(52) U.S. Cl.
CPC ......... *H04N 5/2625* (2013.01); *B22F 3/1055* (2013.01); *B29C 64/153* (2017.08); *B29C 64/386* (2017.08); *G06T 7/0004* (2013.01); *G06T 7/12* (2017.01); *G06T 7/97* (2017.01); *B22F 2003/1056* (2013.01); *B22F 2999/00* (2013.01); *B33Y 10/00* (2014.12); *B33Y 30/00* (2014.12); *B33Y 50/02* (2014.12);
(Continued)

(58) Field of Classification Search
None
See application file for complete search history.

(56) References Cited

U.S. PATENT DOCUMENTS

2004/0212795 A1* 10/2004 Steinbichler ......... G01B 11/162
356/35.5
2008/0287929 A1* 11/2008 Holliday ............. A61F 9/00806
606/5
(Continued)

FOREIGN PATENT DOCUMENTS

DE          10042132 A1    3/2002
DE      102004017769 A1   12/2004
(Continued)

*Primary Examiner* — Eileen M Adams
(74) *Attorney, Agent, or Firm* — Barlow, Josephs & Holmes, Ltd.

(57) ABSTRACT

The invention relates to a method for the determination, at least in regions, of a contour of at least one additively manufactured component layer, in which a contour line of the component layer is traveled over, at least in regions, by a laser beam, and a time exposure of the traveled contour line is produced by a camera system. The invention further relates to a device for the determination, at least in regions, of a contour of at least one additively manufactured component layer. For this purpose, the device comprises at least one laser system, by which a contour line of the component layer can be traveled over, at least in regions, by a laser beam, and a camera system, which is designed to produce a time exposure of the contour line traveled over by the laser beam.

13 Claims, 2 Drawing Sheets

Figure 1:
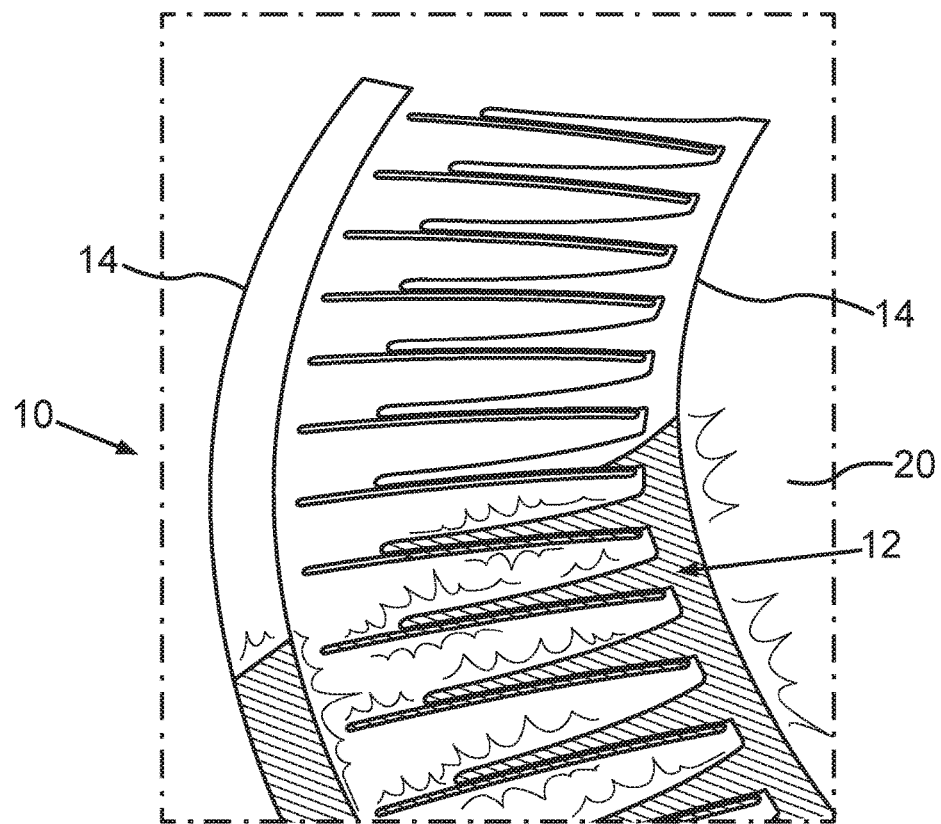

(51) Int. Cl.
*B29C 64/386* (2017.01)
*B33Y 10/00* (2015.01)
*B33Y 30/00* (2015.01)
*B33Y 50/02* (2015.01)

(52) U.S. Cl.
CPC .............. *G06T 2207/10016* (2013.01); *G06T 2207/10101* (2013.01); *Y02P 10/295* (2015.11)

(56) References Cited

U.S. PATENT DOCUMENTS

| | | | | |
|---|---|---|---|---|
| 2009/0202139 | A1* | 8/2009 | Toyoda | G06K 9/6255 382/145 |
| 2012/0041446 | A1* | 2/2012 | Wong | A61B 17/1703 606/96 |
| 2012/0275478 | A1* | 11/2012 | Krausz | H01S 3/0057 372/25 |
| 2013/0020297 | A1* | 1/2013 | Gupta | B23K 26/12 219/121.72 |

FOREIGN PATENT DOCUMENTS

| | | |
|---|---|---|
| DE | 102010011253 A1 | 9/2011 |
| DE | 102011009624 A1 | 8/2012 |
| DE | 102012221218 A1 | 5/2013 |
| EP | 1466718 A2 | 10/2004 |
| EP | 2666612 A1 | 11/2013 |
| WO | 03045669 A1 | 6/2003 |
| WO | 2007147221 A1 | 12/2007 |
| WO | 2012019577 A2 | 2/2012 |
| WO | 2014074947 A2 | 5/2014 |

* cited by examiner

METHOD AND DEVICE FOR DETERMINING A CONTOUR, AT LEAST IN REGIONS, OF AT LEAST ONE ADDITIVELY MANUFACTURED COMPONENT LAYER

BACKGROUND OF THE INVENTION

The invention relates to a method and a device for determining a contour, at least in regions, of at least one additively manufactured component layer.

Additive manufacturing methods relate to processes in which material is deposited layer by layer on the basis of digital 3D construction data in order to construct a component of an aircraft engine, for example, in an additive manner. Accordingly, additive or generative manufacturing methods differ from conventional material-removal or primary forming methods of fabrication. Instead of milling a workpiece from a solid block, for example, additive manufacturing methods construct components layer by layer from one or more materials. Examples of additive manufacturing methods are additive laser sintering or laser melting methods, which are used to produce components for aircraft engines, for example. Such a method is already known from DE 10 2004 017 769 B4, for example. In selective laser melting, thin powder layers of the material or materials used are applied onto a construction platform and locally melted and solidified by one or more laser beams. Afterwards, the construction platform is lowered and another layer of powder is applied and again locally solidified. This cycle is repeated until the finished component is obtained. The finished component can subsequently be further processed as needed or can be used immediately. In selective laser sintering, the component is produced in a similar way by laser-assisted sintering of powder-form materials.

In the additive manufacture of components, process fluctuations can lead to construction defects or flaws, which have a detrimental effect on the quality of the component. In this process, the structure or roughness of the component surface of an additively manufactured component is crucial for the solidity and hence for the quality of the component. Although outer component surfaces can still be post-processed—for example, smoothed or polished—with a certain effort, this is no longer possible for the inner surfaces, such as, for instance, for 3D cooling ducts of engine components. The manufacture of complex inner 3D structures and undercuts, however, especially represents one of the main advantages of generative or additive manufacturing methods. Therefore, it would be necessary already during the additive manufacture of the component, to detect the edge region(s) thereof in order to be able to carry out an evaluation of the surface condition. In particular, it would be desirable to be able to detect the inner surfaces in the case of hollow and complexly formed components.

For the currently known devices and methods, however, a determination and evaluation of the contour lines of individual component layers is not possible or only possible in a very limited manner, because, during the additive manufacture of the component layer, particularly the edges are overexposed owing to the melt glow of the adjacent surface structures. As a result, as a matter of principle, image recordings of the component layer cannot be evaluated because of the overexposure of the contour lines. After the manufacture of the individual component layers, however, an evaluation of the edge region is also not possible or only possible in a very limited manner, because the powder layer directly adjacent to the solidified component layer strongly impedes or even renders impossible a correct detection and evaluation of the edge region.

SUMMARY OF THE INVENTION

The object of the present invention is to make possible an improved process monitoring for such additive manufacturing methods.

This object is achieved in accordance with the invention by a method and a device for the determination, at least in regions, of a contour of at least one additively manufactured component layer. Advantageous embodiments with appropriate enhancements of the invention are presented in the respective dependent claims, wherein advantageous embodiments of the method are to be regarded as advantageous embodiments of the device, and vice versa.

A first aspect of the invention relates to a method for the determination, at least in regions, of a contour of at least one additively manufactured component layer. In accordance with the invention, in the scope of this method, a contour line of the component layer is traveled, at least in regions, by a laser beam and a time exposure of the traveled contour line is produced by a camera system. In this way, on the one hand, a line energy is introduced into the component layer by the laser beam and this energy improves the contour line, which is also referred to as a laser contour line, a laser line, or a skin, of the respective component layer and hence improves the surface quality of the future component. On the other hand, the traveling of the contour line ensures that the edge region of the component layer is not overexposed by the melt glow of adjacent surface regions. Therefore, the contour line can be detected and imaged in its entirety or in regions by the camera system as a time exposure. This time exposure allows a high-precision detection of the contour line belonging to the component surface, without the risk of an overexposure and, consequently, makes possible the evaluation of the surface state. Furthermore, the method according to the invention makes possible a substantial time savings during surface inspection, because the determination can be carried out "online," that is, as part of the additive manufacturing method, for each component layer. In addition, the determination of the contour line by the time exposure enables an evaluation of the component solidity, taking into account, in particular, inner surfaces of the component or of the respective component layer(s). Accordingly, an accelerated development is also possible during the additive manufacture owing to the direct feedback of contour line (skin) and surface nature or characteristics.

In an advantageous embodiment of the invention, when the contour line is traveled, a mean power of the laser beam is adjusted to a lower value than a mean power that was used for the additive manufacture of the component layer. In other words, for optical capture of the component contour layer by layer, the SLM laser travels subsequently once again at a lower power, at least in regions, along the contour line after the melting of a complete component layer has occurred. In this way, too great an input of energy into the edge region of the component layer as well as an overexposure of the time exposure due to melt-glow exposure is prevented in an especially reliable manner. Alternatively or additionally, it is provided that the power is varied one or more times during travel of the contour line, for example, in order to better take into account certain contour paths.

In the process, it has been found to be advantageous when the power is adjusted during travel of the contour line to a value between 50 W and 200 W and/or to a value that corresponds to at most 0.9 times the power that was used for the additive manufacture of the component layer. A power of between 50 W and 200 W is understood, in particular, as powers of 50 W, 51 W, 52 W, 53 W, 54 W, 55 W, 56 W, 57 W, 58 W, 59 W, 60 W, 61 W, 62 W, 63 W, 64 W, 65 W, 66 W, 67 W, 68 W, 69 W, 70 W, 71 W, 72 W, 73 W, 74 W, 75 W, 76 W, 77 W, 78 W, 79 W, 80 W, 81 W, 82 W, 83 W, 84 W, 85 W, 86 W, 87 W, 88 W, 89 W, 90 W, 91 W, 92 W, 93 W, 94 W, 95 W, 96 W, 97 W, 98 W, 99 W, 100 W, 101 W, 102 W, 103 W, 104 W, 105 W, 106 W, 107 W, 108 W, 109 W, 110 W, 111 W, 112 W, 113 W, 114 W, 115 W, 116 W, 117 W, 118 W, 119 W, 120 W, 121 W, 122 W, 123 W, 124 W, 125 W, 126 W, 127 W, 128 W, 129 W, 130 W, 131 W, 132 W, 133 W, 134 W, 135 W, 136 W, 137 W, 138 W, 139 W, 140 W, 141 W, 142 W, 143 W, 144 W, 145 W, 146 W, 147 W, 148 W, 149 W, 150 W, 151 W, 152 W, 153 W, 154 W, 155 W, 156 W, 157 W, 158 W, 159 W, 160 W, 161 W, 162 W, 163 W, 164 W, 165 W, 166 W, 167 W, 168 W, 169 W, 170 W, 171 W, 172 W, 173 W, 174 W, 175 W, 176 W, 177 W, 178 W, 179 W, 180 W, 181 W, 182 W, 183 W, 184 W, 185 W, 186 W, 187 W, 188 W, 189 W, 190 W, 191 W, 192 W, 193 W, 194 W, 195 W, 196 W, 197 W, 198 W, 199 W, or 200 W. Similarly, it can be provided that, during travel, the power is adjusted to 0.9 times, 0.8 times, 0.7 times, 0.6 times, 0.5 times, 0.4 times, 0.3 times, 0.2 times, 0.1 times, or less of the power used for the additive manufacture of the component layer.

In another advantageous embodiment of the invention, it is provided that a mean speed at which the laser beam travels along the contour line is adjusted to a higher value than a mean speed that was used for the additive manufacture of the component layer. In other words, the laser beam is moved more rapidly for recording the contour line than it is during the manufacture of the component region. In this way, on the one hand, a lower input of energy into the edge region of the component layer (contour line) and, on the other hand, a faster time exposure free of overglare is ensured. Alternatively or additionally, the speed of the laser beam is varied one or more times during travel of the contour line, for example, in order to better take into account certain contour paths.

Further advantages ensue when the mean speed at which the laser beam travels along the contour line is adjusted to a value between 900 mm/s and 3000 mm/s and/or to a value that corresponds at least to 1.1 times the speed that was used for the additive manufacture of the component layer. For example, the mean speed of the laser beam can be adjusted to a value of 900 mm/s, 950 mm/s, 1000 mm/s, 1050 mm/s, 1100 mm/s, 1150 mm/s, 1200 mm/s, 1250 mm/s, 1300 mm/s, 1350 mm/s, 1400 mm/s, 1450 mm/s, 1500 mm/s, 1550 mm/s, 1600 mm/s, 1650 mm/s, 1700 mm/s, 1750 mm/s, 1800 mm/s, 1850 mm/s, 1900 mm/s, 1950 mm/s, 2000 mm/s, 2050 mm/s, 2100 mm/s, 2150 mm/s, 2200 mm/s, 2250 mm/s, 2300 mm/s, 2350 mm/s, 2400 mm/s, 2450 mm/s, 2500 mm/s, 2550 mm/s, 2600 mm/s, 2650 mm/s, 2700 mm/s, 2750 mm/s, 2800 mm/s, 2850 mm/s, 2900 mm/s, 2950 mm/s or 3000 mm/s or to corresponding intermediate values, such as, for instance, 1000 mm/s, 1001 mm/s, 1002 mm/s, 1003 mm/s, 1004 mm/s, 1005 mm/s, 1006 mm/s, 1007 mm/s, 1008 mm/s, 1009 mm/s, 1010 mm/s, 1011 mm/s, 1012 mm/s, 1013 mm/s, 1014 mm/s, 1015 mm/s, 1016 mm/s, 1017 mm/s, 1018 mm/s, 1019 mm/s, 1020 mm/s, 1021 mm/s, 1022 mm/s, 1023 mm/s, 1024 mm/s, 1025 mm/s, 1026 mm/s, 1027 mm/s, 1028 mm/s, 1029 mm/s, 1030 mm/s, 1031 mm/s, 1032 mm/s, 1033 mm/s, 1034 mm/s, 1035 mm/s, 1036 mm/s, 1037 mm/s, 1038 mm/s, 1039 mm/s, 1040 mm/s, 1041 mm/s, 1042 mm/s, 1043 mm/s, 1044 mm/s, 1045 mm/s, 1046 mm/s, 1047 mm/s, 1048 mm/s, 1049 mm/s, 1050 mm/s, etc. Alternatively or additionally, the mean speed of the laser beam can be adjusted to a value that is higher by a factor of 1.1, 1.2, 1.3, 1.4, 1.5, 1.6, 1.7, 1.8, 1.9, or more than the mean speed value that was used for the additive manufacture of the component layer.

In another advantageous embodiment of the invention, it is provided that a recording time for the time exposure is adjusted to a value that lies between 0.5 second and 60 seconds. In other words, the recording time of the time exposure is adjusted to a value of 0.5 s, 1 s, 2 s, 3 s, 4 s, 5 s, 6 s, 7 s, 8 s, 9 s, 10 s, 11 s, 12 s, 13 s, 14 s, 15 s, 16 s, 17 s, 18 s, 19 s, 20 s, 21 s, 22 s, 23 s, 24 s, 25 s, 26 s, 27 s, 28 s, 29 s, 30 s, 31 s, 32 s, 33 s, 34 s, 35 s, 36 s, 37 s, 38 s, 39 s, 40 s, 41 s, 42 s, 43 s, 44 s, 45 s, 46 s, 47 s, 48 s, 49 s, 50 s, 51 s, 52 s, 53 s, 54 s, 55 s, 56 s, 57 s, 58 s, 59 s, or 60 s or to a corresponding intermediate value. Alternatively or additionally, it is provided that the recording time of the time exposure is adjusted in such a way that at least one quality-relevant region of the contour line is completely imaged on the time exposure. The recording time can therefore be adjusted, for example, depending on the length of the contour line or of the quality-relevant region of the contour line and depending on the speed of the laser beam.

In another advantageous embodiment of the invention, an optical tomography device is used as a camera system. This allows a high-precision capture of the contour line. In addition to this, in many cases, conventionally used laser sintering and/or laser melting apparatus have at their disposition an optical tomography device for recording the individual component layers, so that this optical tomography device can also be used advantageously for producing the time exposure of the contour line.

Further advantages ensue in that the time exposure is subjected to an edge detection method by a computing device. The intensity profile of a contour line is asymmetric in principle, since solid, fused material (the component or the component layer) is located on one side of the contour line and only bulk powder on the other side. As a result, different thermal conductions result, which lead to asymmetry of the melt glow during laser irradiation. An edge detection can be used to make this asymmetry visible in a simple manner. To this end, the time exposure of the contour line is segmented in that surface regions are separated from one another if they differ sufficiently in terms of color or gray value, brightness, or texture along straight or curved lines. In this process, through the application of corresponding edge operators, transitions between separated regions are identified and marked as edges. At the same time, homogeneous image regions are identified as such and not subdivided into two or more surfaces. This permits an especially precise identification of the contour line(s), that is, of the transition between the component layer and the powder layer, as a result of which a correspondingly reliable identification and evaluation of the contour line path is made possible. Alternatively or additionally, it is provided that the time exposure is combined with at least one further time exposure to form an image stack by the computing device. In this way, the individual contour lines of the component layers can be combined to form an image stack and visualized by 3D software, for example. This enables all component surfaces, inner as well as outer, also to be able to be evaluated over their surface areas.

In another advantageous embodiment of the invention, it is provided that, on the basis of at least one time exposure, a quality evaluation of the contour line of the component layer is carried out. Accordingly, a monitoring and evaluation of the individual component layers as well as, if need be, of the entire surface of the finished component, for example in terms of roughness, microporosity, and cracks, is possible.

In another embodiment of the invention, it is provided that the component layer is classified as being qualitatively not OK when a quality defect from the following group is present: inadmissible deviation of the contour line, irregular shape of the contour line, inadmissible interruption of the contour line, and inadmissible intensity fluctuations along the contour line; or the contour line is classified as being qualitatively OK when no quality defect from the following group is present: inadmissible dimensional deviation of the contour line, irregular shape of the contour line, inadmissible interruption of the contour line, and inadmissible intensity fluctuations along the contour line. In this way, it is ensured that qualitatively inadmissible components can be reliably identified and sorted out. Of course, components for which the contour line is classified as qualitatively OK may have other kinds of quality defects in the interior of the component layer.

A second aspect of the invention relates to a device for the determination, at least in regions, of a contour of at least one additively manufactured component layer. To this end, the device according to the invention comprises at least one laser system, by which a contour line of the component layer can be traveled, at least in regions, by a laser beam, as well as a camera system, which is designed to produce a time exposure of the contour line traveled by the laser beam. In this way, on the one hand, a line energy is introduced into the component layer by the laser beam, this energy improving the contour line, which is also referred to as a laser contour line, a laser line, or a skin, of the respective component layer and hence the surface quality of the future component. On the other hand, the traveling of the contour line is able to ensure that the edge region of the component layer is not overexposed by the melt glow of adjacent surface area regions. Therefore, the contour line can be captured and imaged in its entirety or in regions by the camera system as a time exposure. This time exposure allows a high-precision capture of the contour line belonging to the component surface, without the risk of overexposure and, consequently, makes possible the evaluation of the surface state. Furthermore, the method according to the invention makes possible a substantial time savings during surface inspection, because the determination can be carried out "online," that is, as part of the additive manufacturing method, for each component layer. In addition, the determination of the contour line by the time exposure enables an evaluation of the component solidity, taking into account, in particular, inner surfaces of the component or of the respective component layer(s). Accordingly, an accelerated development is also possible during the additive manufacture owing to the direct feedback of contour line (skin) and surface state. Further features and the advantages thereof ensue from the description of the first aspect of the invention, wherein advantageous embodiments of the first aspect of the invention are to be regarded as advantageous embodiments of the second aspect of the invention, and vice versa.

In another advantageous embodiment of the invention, the device comprises a synchronization device, by which the camera system can be controlled in such a way that the time exposure can be started and/or stopped depending on an operating state of the laser system. In other words, the device has a synchronization functionality that controls and/or regulates the camera recording depending on the laser system. Only when the travel or recording of the contour line starts does the synchronization device emit a start signal to the camera system, as a result of which the time exposure begins. Accordingly, it is prevented that the edge region of the component is overexposed by the melt glow of the surface area structure. Furthermore, it is ensured that the desired contour line or the desired contour line region is completely imaged on the finished time exposure. Once the contour line or the desired contour line region has been traveled, the synchronization device sends a stop signal to the camera system to end the recording and to create the time exposure.

Further advantages ensue in that the camera system comprises an optical tomography device (OT) and/or a camera with a resolution of at least 4 megapixels and/or a camera with a dynamic range of at least 14 bits and/or a camera with a spectral sensitivity in the visible and/or infrared region. An OT, which is present in any case, if need be, can be used advantageously to record the time exposure, that is, a second image of the traveled contour line, after capture of an area image of the additively manufactured component layer. Preferably, the camera of the camera system has a resolution of at least 4 megapixels, preferably at least 5 megapixels, more preferably at least 20 megapixels. In particular, the camera has a resolution of at least 40 megapixels. Because the contour line is a relatively filigreed image structure, the contour line is only 2 pixels or 1 pixel wide in many cases for cameras with less than 4 megapixels, which makes the evaluation of the contour line very difficult. In accordance herewith, the contour line has a minimum width of 5 to 10 pixels when a camera with 20 megapixels or more is used, and this substantially simplifies a reliable evaluation of the time exposure. In accordance herewith, cameras with as high as possible a dynamic range of 14 bits or more improve the evaluation of the time exposure. Alternatively, high-contrast images also can be produced, if need be, from an exposure series of conventional images with low dynamic range. In one embodiment, the spectral sensitivity of the camera lies in the visible wavelength region between about 400 nm and about 700 nm. Whereas the visible region can usually be imaged with CCD and CMOS cameras, InGaAs cameras can be used in the near infrared (NIR, 900 nm to 1700 nm). An NIR camera has an outstanding spectral sensitivity and achieves a quantum efficiency of greater than 80%. In addition, an NIR camera can be used not only for time exposures, but also for thermographic applications. SWIR cameras, which are also referred to as short-wavelength infrared cameras, utilize MCT detectors and cover the range of about 850 nm to 2500 nm. In the case of hot objects, such as additively manufactured component layers, an SWIR camera can additionally be used as a thermographic camera or thermal imaging camera.

In another advantageous embodiment of the invention, it is provided that the device comprises a computing device, by which the time exposure can be subjected to an edge detection method and/or by which the time exposure can be combined with at least one other time exposures to form an image stack and/or by which a quality evaluation of the contour line of the component layer can be carried out on the basis of at least one time exposure.

Further advantages ensue in that the device comprises an additive laser sintering and/or laser melting device, by which the at least one component layer can be manufactured. In this way, it is possible to carry out a sequential online inspection of the individual manufactured component layers. Furthermore, there exists the possibility of actuating the additive laser sintering and/or laser melting device depending on the evaluation of the contour line, so that a following component layer can be manufactured in such a way that any structure defects and other component defects are repaired or compensated for.

BRIEF DESCRIPTION OF THE DRAWING FIGURES

Figure 2:
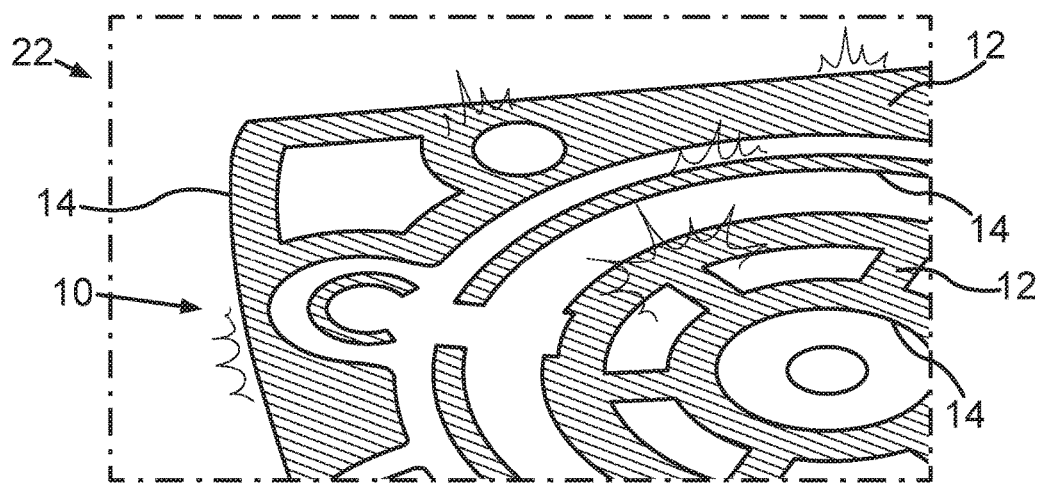
Figure 3:
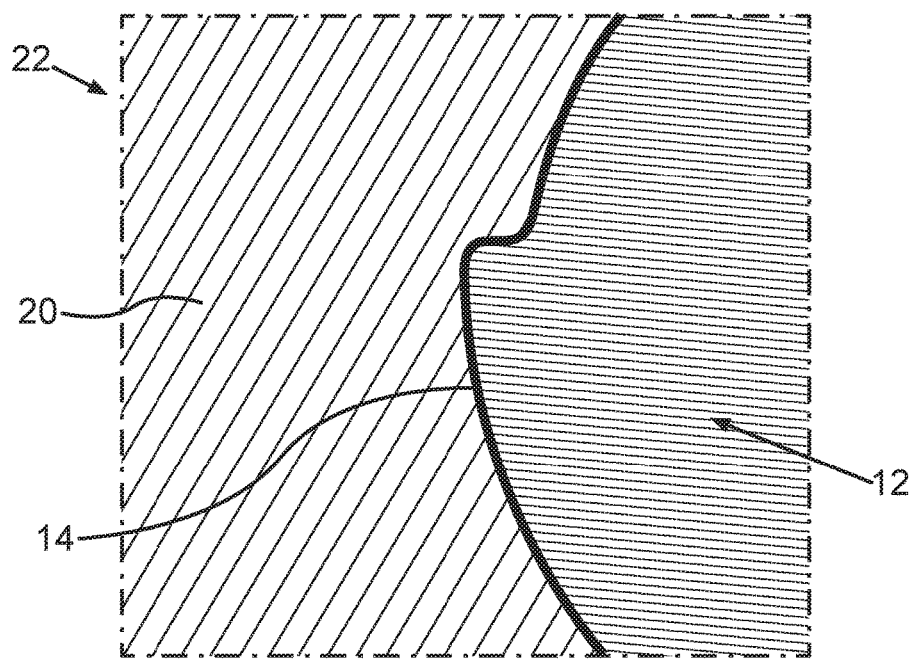
Figure 4:
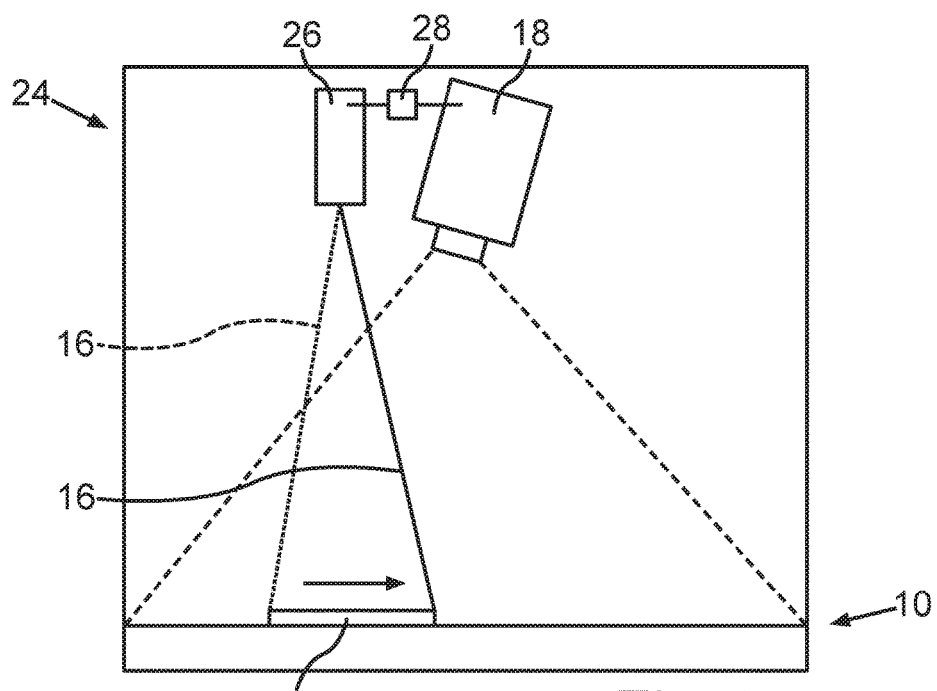

Further features of the invention ensue from the claims and the exemplary embodiment, as well as on the basis of the drawings. The features and combinations of features mentioned in the description as well as the features and combinations of features mentioned below in the exemplary embodiment can be used not only in the respectively given combinations, but also in other combinations, without departing from the scope of the invention. Accordingly, the invention also comprises and discloses embodiments that are not explicitly shown and discussed in the exemplary embodiments, but ensue and can be created through separate combinations of features from the discussed embodiments. Embodiments and combinations of features that, accordingly, do not have all features of an originally formulated independent claim are also to be regarded as being disclosed. Shown are:

FIG. 1 a time-exposed imaging of a component layer, which is being manufactured by an additive laser melting method;

FIG. 2 an excerpt of a time exposure of an additively manufactured component layer, for which a contour line is traveled by a laser beam;

FIG. 3 an excerpt of the time exposure shown in FIG. 2, on which an edge filter has been applied; and FIG. 4 an illustration of the principle of a device according to the invention for the determination, at least in regions, of a contour of an additively manufactured component layer.

DESCRIPTION OF THE INVENTION

FIG. 1 shows a time-exposed imaging of a component layer 10 of a component for an aircraft engine while it is being manufactured by an additive laser melting method (selective laser melting, SLM process), which is known in and of itself. Besides the surface welded regions 12, the contour line 14 of the component layer 10 also is partially revealed. It can be seen that the intensity profile of the contour line 14 is asymmetric in principle, because solid fused material (the component layer 10) is located on one side of the contour line 14 and only bulk metal powder 20 is located on the other side. This results in different thermal conductions, which lead to asymmetry of the melt glow. In addition to this, it can be seen that the contour line 14 is overexposed during this time-exposed imaging by the melt glow of the surface area welded regions 12, as a result of which a reliable determination and evaluation of the contour line 14 is rendered impossible. The structure or roughness of the component surface, however, is crucial as well for the solidity and hence for the quality of the finished component. Although outer component surfaces can still be smoothed or even polished with a certain effort, this is no longer possible for inner surfaces (for example, 3D cooling ducts). However, especially the manufacture of these inner 3D structures represents one of the main advantages of additive manufacture.

In order to solve this problem, it is provided in the framework of the method according to the invention that the contour line 14 of the component layer 10 is traveled over once more, at least in regions, by the laser beam 16 (FIG. 4) after the manufacture of the component layer 10, while a time exposure 22 of the traveled contour line 14 is produced by a camera system 18. This method may also be referred to as the "skin capture method." In this way, a line energy is introduced into the component layer 10 by the laser beam 16 and improves the contour line 14, which is also referred to as a laser contour line, a laser line, or a skin, of the respective component layer 10, and hence the surface quality of the future component is improved. On the other hand, the traveling of the contour line 14 ensures that the edge region of the component layer 10 is not overexposed by the melt glow of adjacent surface-area welded regions 12. Therefore, the contour line 14 can be captured and imaged in its entirety or in regions by the camera system 18 as a time exposure 22. This time exposure 22 allows a high-precision capture of the contour line 14 belonging to the component surface, without the risk of an overexposure and consequently, makes possible the evaluation of the surface state of the component layer 10 or of the finished component.

FIG. 2 shows, for more detailed discussion, an excerpt of such a time exposure 22, in which, subsequent to the manufacture of the component layer 10, only the contour line 14 or the contour lines 14, but not the surface-area welded regions 12, is (are) traveled over once more by a laser beam 16. To this end, the laser beam 16 is used once more for traveling along the contour line(s) 14 after melting of the complete component layer 10 has occurred, wherein the laser beam 16 travels faster and at lower power along the contour line(s) 14 than during the manufacture of the component layer 10. For example, the laser beam 16 is operated with a power of 140 W instead of 285 W and with a speed of 1400 mm/s instead of 800 mm/s. This line energy that is thereby introduced into the edge region of the component layer 10 allows not only a better determination of the contour line 14, but also improves the surface quality of the component layer 10 or of the finished component.

The contour line 14 is recorded using an optical, local and dynamic high-resolution camera system 18 (compare FIG. 4) by time exposure. The camera system 18 can, for example, have a resolution of 20 to 40 megapixels with a 14-bit dynamic range. The imaging time of the time exposure 22 can be between 1 and 10 seconds, for example. Preferably, the imaging time is chosen in such a way that the entire contour line 14 or at least a region of the contour line 14 that is to be evaluated is imaged completely on a time exposure 22. From the intensity and shape of the contour line 14, it is then possible as part of a subsequent quality inspection to check for the presence of quality problems, such as roughness, adhering particles, process abnormalities, microporosity, cracks, etc.

For further improvement of the evaluation, the time exposure 22 can be subjected to an edge detection method by a computing device. To this end, FIG. 3 shows an excerpt of the time exposure 22 shown in FIG. 2, on which an edge filter has been applied. The main difference between various edge filters lies in the fact that they utilize different filter masks. The best known edge filters (also edge operators) are the Sobel operator, the Scharr operator, the Laplace filter, the Prewitt operator, the Roberts operator, the Kirsch operator, the Canny algorithm, the Marr-Hildreth operator, contrast amplifiers, and active contour (snake) and can be chosen as needed. Similarly, it is possible as part of the edge detection method to apply a plurality of edge filters on the time exposure 22. Through the application of one or a plurality of edge filters, the time exposure 22 is converted to an associated edge image, in which all edges, that is, the contour lines 14, are correspondingly readily identifiable and can be evaluated. Clearly to be seen in FIG. 3 are the differences between the surface-area welded region 12, the contour line 14, and the adjacent bulk metal powder 20.

FIG. 4 shows an illustration of the principle of a device 24 according to the invention for the determination, at least in regions, of a contour of an additively manufactured component layer 10. In this case, the device 24 is fundamentally designed as a laser melting production unit (SLM production unit) and comprises a laser system 26, by which the contour line 14 can be traveled over each component layer 10, at least in regions, by the laser beam 16. Furthermore, the unit 24 comprises the already mentioned camera system 18, which is designed to produce time exposures 22 of the contour lines 14 traveled over by the laser beam 16. In this case, the start of the recording of the time exposure 22 is triggered through the SLM production unit 24 or by a corresponding synchronization device 28; only when the contour line 14 is transcribed does the camera system 18 record the time exposure 22. In this way, it is prevented that the edge region of the component layer 10 is overexposed by the melt glow of the surface-area welded regions 12.

In an advantageous embodiment, the method can be implemented by an OT camera system 18 (optical tomography). In the process, the OT camera system 18 simply records a second image after capturing the surface-area image of the component layer 10, that is, the time exposure 22 with the contour line 14. As in the case of OT, it is also possible in the skin capture method to combine the individual contour lines 14 or the time exposures 22 to form a 3D image stack and visualize it by 3D software (for example, Volume Graphics). All of the component surfaces (inner as well as outer) can then also be evaluated over their surface areas.

The parameter values given in the documents for definition of process and measurement conditions for characterizing specific properties of the subject of the invention are also to be viewed in the scope of deviations—for example, deviations due to measurement errors, system errors, DIN tolerances, and the like—as also being within the scope of the invention.

What is claimed is:

1. A method for the determination, at least in regions, of a contour of at least one additively manufactured component layer, comprising the steps of:
    creating a component layer by additive manufacturing;
    traveling over a contour line of the component layer, at least in regions, by a laser beam;
    producing a time exposure by capturing a single image of the laser beam travel over the contour line by a camera system; and
    evaluating the quality of the contour line of the component layer from the single image of the laser beam,
    wherein a mean speed with which the laser beam travels over the contour line is adjusted to a higher value than a mean speed that was used for the additive manufacture of the component layer, and/or in that the speed of the laser beam is varied one or more times during its travel over the contour line, and
    wherein the mean speed with which the laser beam travels over the contour line is adjusted to a value between 900 mm/s and 3000 m/s and/or to a value that corresponds to at least 1.1 times the speed that was used for the additive manufacture of the component layer.

2. The method according to claim 1, wherein, when the contour line is traveled, a mean power of the laser beam is adjusted to a lower value than a mean power that was used for the additive manufacture of the component layer, and/or in that the power during the travel of the contour line is varied one or more times.

3. The method according to claim 2, wherein, when the contour line is traveled over, the power is adjusted to a value between 50 W and 200 W, and/or corresponds to a value that is at most 0.9 times the power that was used for the additive manufacture of the component layer.

4. The method according to claim 1, wherein a recording time of the time exposure is adjusted to a value that lies between 0.5 second and 60 seconds, and/or in that a recording time of the time exposure is adjusted in such a way that at least a quality-relevant region of the contour line is imaged completely on the time exposure.

5. The method according to claim 1, wherein an optical tomography device is used as the camera system.

6. The method according to claim 1, wherein the time exposure is subjected to an edge detection method by a computing device and/or is combined with at least one further time exposure by the computing device to form an image stack.

7. The method according to claim 1, wherein, on the basis of at least one time exposure, a quality evaluation of the contour line of the component layer is carried out.

8. The method according to claim 7, wherein the component layer is classified as being qualitatively not OK when a quality defect from the following group is present: inadmissible dimensional deviation of the contour line, irregular shape of the contour line, inadmissible interruption of the contour line, and inadmissible intensity fluctuations along the contour line; or the contour line is classified as being qualitatively OK when no quality defect from the following group is present: inadmissible dimensional deviation of the contour line, irregular shape of the contour line, inadmissible interruption of the contour line, and inadmissible intensity fluctuations along the contour line.

9. A device for the determination, at least in regions, of a contour of at least one additively manufactured component layer, comprising:
    at least one laser system, by which a contour line of the component layer can be traveled over, at least in regions, by a laser beam; and
    a camera system, which is configured and arranged to produce a time exposure, in a single image, of the contour line that is traveled over by the laser beam, the single image enabling the evaluation and determination of the quality of the contour line of the component layer,
    wherein the laser beam is configured and arranged to have a mean speed that travels over the contour line adjusted to a higher value than a mean speed that was used for the additive manufacture of the component layer, and/or in that the speed of the laser beam is configured and arranged to be varied one or more times during its travel over the contour line, and
    wherein the mean speed with which the laser beam travels over the contour line is configured and arranged to be adjusted to a value between 900 mm/s and 3000 m/s and/or to a value that corresponds to at least 1.1 times the speed that was used for the additive manufacture of the component layer.

10. The device according to claim 9, further comprising:
    a synchronization device, by which the camera system can be actuated in such a way that the time exposure can be started and/or stopped depending on an operating state of the laser system.

11. The device according to claim 9, wherein the camera system comprises an optical tomography device and/or a camera with a resolution of at least 4 megapixels and/or a camera with a dynamic range of at least 14 bits, and/or a camera with a spectral sensitivity in the visible and/or infrared region(s).

12. The device according to claim 9, further comprising:
a computing device, by which the time exposure can be subjected to an edge detection method and/or by which the time exposure can be combined with at least one other time exposure to form an image stack and/or by which a quality evaluation of the contour line of the component layer can be carried out on the basis of at least one time exposure.

13. The device according to claim 9, further comprising:
an additive laser sintering and/or laser melting device, by which the at least one component layer can be manufactured.

* * * * *